(12) United States Patent
Martin

(10) Patent No.: US 7,266,527 B1
(45) Date of Patent: Sep. 4, 2007

(54) METHOD AND DEVICE FOR PREVENTING CHECK FRAUD

(76) Inventor: David A. Martin, 35521 Quatermane Cir., Bentleyville, OH (US) 44139

( * ) Notice: Subject to any disclaimer, the term of this patent is extended or adjusted under 35 U.S.C. 154(b) by 0 days.

(21) Appl. No.: 09/345,202

(22) Filed: Jun. 30, 1999

(51) Int. Cl.
*G06Q 40/00* (2006.01)
(52) U.S. Cl. .......................................... 705/45; 705/35
(58) Field of Classification Search ................ 705/45, 705/35
See application file for complete search history.

(56) References Cited

U.S. PATENT DOCUMENTS

| | | |
|---|---|---|
| 3,829,133 A | 8/1974 | Smagala-Romanoff |
| 3,890,599 A | 6/1975 | Simjian |
| 3,950,015 A | 4/1976 | Shrock |
| 3,985,998 A | 10/1976 | Crafton |
| 3,990,558 A | 11/1976 | Ehrat |
| 4,211,918 A | 7/1980 | Nyfeler et al. |
| 4,264,808 A | 4/1981 | Owens et al. |
| 4,317,028 A | 2/1982 | Simjian |
| 4,375,032 A | 2/1983 | Uchida |
| 4,417,136 A | 11/1983 | Rushby et al. |
| 4,472,626 A | 9/1984 | Frid |
| 4,588,211 A | 5/1986 | Greene |
| 4,634,148 A | 1/1987 | Greene |
| 4,637,634 A | 1/1987 | Troy et al. |
| 4,667,985 A | 5/1987 | Leonard et al. |
| 4,672,377 A | 6/1987 | Murphy et al. |
| 4,798,403 A | 1/1989 | Nelson |
| 4,807,287 A | 2/1989 | Tucker et al. |
| 4,859,838 A | 8/1989 | Okiharu |
| 4,903,991 A | 2/1990 | Wright |
| 4,944,532 A | 7/1990 | Pollard |
| 4,948,174 A | 8/1990 | Thomson et al. |
| 5,006,698 A | 4/1991 | Barakat |
| 5,044,668 A | 9/1991 | Wright |
| 5,080,399 A | 1/1992 | Olson |
| 5,146,512 A | 9/1992 | Weideman et al. |
| 5,244,235 A | 9/1993 | Helgeson |
| 5,341,428 A | 8/1994 | Schatz |
| 5,342,094 A | 8/1994 | Duck |
| 5,367,148 A * | 11/1994 | Storch et al. ............... 275/375 |
| 5,369,709 A | 11/1994 | Foreman et al. |
| 5,371,798 A | 12/1994 | McWhortor |
| 5,377,271 A | 12/1994 | Foreman et al. |
| 5,426,700 A | 6/1995 | Berson |
| 5,432,506 A * | 7/1995 | Chapman ............... 340/825.34 |
| 5,444,794 A | 8/1995 | Uhland, Sr. |

(Continued)

OTHER PUBLICATIONS

Safe Cheq, 1999.
Smart Checks, 1999.
Check Fraud: A Guide to Avoiding Losses.
US 6,232,740, 05/2001, Kadour (withdrawn)*

*Primary Examiner*—Jagdish N Patel
(74) *Attorney, Agent, or Firm*—Brouse McDowell; Daniel A. Thomson

(57) ABSTRACT

An inventive check is disclosed including a barcode, which includes at least one of the following pieces of information: the date the check was paid, the amount of the check, the payee, the drawers account number, the banks routing number, and the identifier number of the check. A method for preventing check fraud is also provided, including the steps of attaching a machine readable code on a negotiable instrument, creating a negotiable instrument, the drawee receiving the negotiable instrument, and the drawee scanning the machine readable code. A method is also included for integrating the entire checking process.

12 Claims, 1 Drawing Sheet

U.S. PATENT DOCUMENTS

| | | | |
|---|---|---|---|
| 5,456,498 A * | 10/1995 | Greene | 283/70 |
| 5,506,691 A | 4/1996 | Bednar | |
| 5,509,692 A | 4/1996 | Oz | |
| 5,537,486 A | 7/1996 | Stratigos et al. | |
| 5,594,226 A | 1/1997 | Steger | |
| 5,677,521 A | 10/1997 | Garrou | |
| 5,691,524 A | 11/1997 | Josephson | |
| 5,708,717 A | 1/1998 | Alasia | |
| 5,754,674 A | 5/1998 | Ott et al. | |
| 5,781,654 A | 7/1998 | Carney | |
| 5,784,503 A | 7/1998 | Bleecker, III et al. | |
| 5,801,366 A | 9/1998 | Funk et al. | |
| 5,818,021 A | 10/1998 | Szewczykowski | |
| 5,819,236 A | 10/1998 | Josephson | 705/35 |
| 5,825,506 A | 10/1998 | Bednar et al. | |
| 5,832,464 A | 11/1998 | Houvener et al. | 705/45 |
| 5,838,814 A | 11/1998 | Moore | |
| 5,848,202 A | 12/1998 | D'Eri et al. | |
| 5,890,141 A | 3/1999 | Carney et al. | |
| 5,892,827 A | 4/1999 | Beach et al. | |
| 5,903,881 A | 5/1999 | Schrader et al. | 705/42 |
| 5,925,865 A | 7/1999 | Steger | |
| 5,926,550 A | 7/1999 | Davis | |
| 5,926,551 A | 7/1999 | Dwork et al. | |
| 5,974,548 A | 10/1999 | Adams | |
| 6,038,351 A | 3/2000 | Rigakos | |
| 6,038,553 A | 3/2000 | Hyde, Jr. | |
| 6,059,185 A | 5/2000 | Funk et al. | |
| 6,070,798 A | 6/2000 | Nethery | |
| 6,073,118 A | 6/2000 | Gormish et al. | |
| 6,073,121 A | 6/2000 | Ramzy | 705/45 |
| 6,111,953 A | 8/2000 | Walker et al. | |
| 6,126,203 A | 10/2000 | Dwork et al. | |
| 6,129,273 A | 10/2000 | Shah | |
| 6,181,812 B1 | 1/2001 | Rodite | |
| 6,181,814 B1 * | 1/2001 | Carney | 382/137 |
| 6,181,837 B1 | 1/2001 | Cahill et al. | |
| 6,195,452 B1 * | 2/2001 | Royer | 382/135 |
| 6,195,453 B1 | 2/2001 | Simonoff | |
| 6,212,504 B1 | 4/2001 | Hayosh | |
| 6,212,638 B1 | 4/2001 | Lee et al. | |
| 6,224,111 B1 | 5/2001 | Zehner | |
| 6,233,340 B1 | 5/2001 | Sandru | |
| 6,301,379 B1 | 10/2001 | Thompson et al. | |
| 6,351,815 B1 | 2/2002 | Adams | |

* cited by examiner

METHOD AND DEVICE FOR PREVENTING CHECK FRAUD

BACKGROUND OF THE INVENTION

1. Field of Invention

This invention pertains to the art of devices and methods for preventing check fraud, and more particularly to an integrated fraud-preventing process between the customer and the bank.

2. Description of the Related Art

It is well known that check fraud is one of the largest challenges facing financial institutions today. Technology has made it increasingly simple for criminals, either independently or in organized gangs, to create increasingly realistic counterfeit checks and false identification that can be used to defraud banks. A 1994 survey by the American Bankers Association found that 54% of community banks, 94% of mid-sized banks, and 88% of large banks sustained losses from check fraud in 1993. Between 1991 and 1993, the number of fraudulent checks submitted increased 136%, from 537,000 to 1,267,000. Over the same period, annual losses from those frauds increased to reach $815,000,000.

Thrifts, savings banks, and other financial institutions, retail merchants, government agencies, and large corporations, are also victims of check fraud. A recent survey of more than 2,000 large US corporations concluded that on average, they lost approximately $360,000 a year to check fraud. The FBI estimates that if commercial banks and other institutions combined their check fraud losses, the total would be $12 billion to $15 billion annually.

Several methods have been tried in order to curtail the problem of check fraud in the banking industry. One of the ways that has been used is called positive pay. Positive pay allows a company and its bank to work together to detect check fraud by identifying items presented for payment that the company did not issue. In the usual case, the company electronically transmits to the bank a list of all checks that issued on a particular day. The bank verifies checks received for payment against that list and pays only those on the list. The bank rejects checks not on the company's list, checks that exceed a specific dollar amount, or checks that carry dates long past. The bank investigates rejected checks to find out if the items are fraudulent or in error. The bank only pays exception items approved by the company.

Another related method of curtailing check fraud is reverse positive pay. Reverse positive pay is similar to positive pay, but the process is reversed, with the company, not the bank, maintaining a list of checks issued. When checks are presented for payment and clear through the Federal Reserve system, the Federal Reserve prepares a file of the check's account numbers, serial numbers, and dollar amounts, and sends the file to the bank. In reverse positive pay, the bank sends that file to the company, where the company compares the information to its internal records. The company lets the bank know which checks match its internal information, and the bank pays those items. The bank then researches the checks that do not match, corrects any misreads or encoding errors, and determines if any items are fraudulent. The bank pays only "true exceptions", that is, those that can be reconciled with the company's files.

Another security measure that some banks have used, and seen a reduction in check fraud as result of, is fingerprinting non-customers that seek to cash checks. Generally, the programs require all persons presenting checks for payment who do not have an account with the bank to provide a thumbprint. A person who does not object to providing a fingerprint is asked to ink his or her thumb on a small pad and place the imprint in the space between the memo line and the signature line of the check being presented. If the bank later finds out that the check was fraudulent or was altered it can provide the check, with the fingerprint, to law enforcement officials.

A final known security measure is adding security features to the checks themselves. Some of the useful security measures include the following: watermarks, copy void pantograph, chemical voids, high resolution microprinting, 3 dimensional reflective holo-stripe and security inks. Each of these measures will be briefly summarized. 1.) Watermarks are made by applying different degrees of pressure during the paper manufacturing process. Most watermarks make subtle designs on the front and back of the checks. These marks are not easily visible and can only be seen when they are held up to light at a 45° angle. 2.) Copy void pantographs are patented designs in the background pattern of checks. When photocopied, the pattern changes and the word "VOID" appears, making the copy non-negotiable. 3.) Chemical voids involve treating check paper in a manner that is not detectable until eradicator chemicals contact the paper. When chemicals are applied, the treatment causes the word "VOID" to appear, making the item non-negotiable. Checks treated with chemical voids cannot be altered without detection. 4.) High resolution microprinting is very small printing typically used for the signature line of a check or around the border in what appears to be a line or pattern to the naked the eye. When magnified the line or pattern contains a series of words that run together or become totally illegible if the check has been photocopied or scanned with a desktop scanner. 5.) A 3-dimensional reflective holo-stripe is a metallic stripe that contains one or more holograms, similar to those in credit cards. These items are difficult to forge, scan, or reproduce because they are produced by a sophisticated, laser based etching process. 6.) Security inks react with common eradication chemicals. These inks reduce a forger's ability to modify the printed dollar amount or alter the designated payee because when solvents are applied, a chemical reaction with the security ink distorts the appearance of the check. This makes such items very difficult to alter without detection.

Although these security measures have been somewhat effective in deterring check fraud, the problem still persists. The currently known security measures are generally fairly expensive, and usually only available to medium to large size businesses. The present invention allows for an easy and efficient method for verifying the validity of a check, and can be used by even the individual customer. The present invention provides further security measures for verifying the validity of a check received by the banking system.

Another problem in the banking industry is the delay that occurs from the time a check is written until the time the check finally clears the bank and is paid to the payee. Currently, if the payee bank and the drawee bank are separate entities, the process could take several days. The current invention presents a method for integrating the entire process and making it instantaneous.

One known method for verifying and tracking checks is found in U.S. Pat. No. 5,594,226 to Steger. Steger provides an apparatus for automatically accessing and verifying checking account status based on information containing a barcode printed on a check, travelers check, or money order. This method deals with a point-of-sale check verification system, and not a method for clearing checks at a bank. The Steger patent is mainly a method for determining that a checking account has enough money to cover the check that is being presented. The present invention allows a check to be created with a barcode containing the payee, the amount of the check, and the date of the check, so that when the bank receives the check for presentment, it can verify the authenticity of the check.

Another known method for verifying checks is found in U.S. Pat. No. 5,903,881 to Schrader et al. Schrader provides a software product, computer implemented, method and system to integrate a user interface having three simultaneously displaced items of information. The interface displays the account balance, and both cleared and uncleared transactions. However, this invention does not have any way of preventing a fraudulent check from being cleared by the bank. The present invention allows the bank to check the authenticity of a check before it is cleared by the bank.

Difficulties inherent in the related art are therefore overcome in a way that is simple and efficient while providing better and more advantageous results.

DEFINITION OF TERMS

To assist the reader in understanding the description of this invention, the definitions of the following terms should be noted.

Customer—A person with an account at the bank.

Drawee—A party, typically a bank, that is required to pay out the money when a check or draft is presented. The drawee is usually the payor bank.

Drawer—A person writing a check. The drawer is typically a customer of the drawee.

MICR—(Magnetic Ink Character Recognition) Numbers at the bottom of a check, printed in magnetic ink, which can be read by machines. The numbers usually are encoded with the name and address of the drawee bank, the account number, and the check number. The dollar amount is added to the MICR line during check processing.

Payee—A party entitled, by the creation of a draft or check, to receive funds from a drawee.

Presentment—The delivery of a check or draft to the drawee or the drawer for payment.

Negotiable Instrument—An unconditional promise or order to pay a fixed amount of money, with or without interest or other charges described in the promise or to order, if it 1) is payable to a bearer or to order at the time it is issued or first comes into possession of a holder, 2) is payable on demand or at a definite time, and 3) does not state any other undertaking or instruction by the person promising or ordering payment to do any act in addition to the payment of money, but the promise or order may contain (i) an undertaking or power to give, maintain, or protect collateral to secure payments, (ii) an authorization or power to the holder to confess judgment or realize on or dispose of collateral, or (iii) a waiver of the benefit of any law intended for the advantage or protection of an obligor.

SUMMARY OF THE INVENTION

In accordance with one aspect of the current invention, a method for preventing check fraud includes the steps of providing a bank with a bank routing number, providing a customer having an account with the bank and a corresponding account number, having the customer electronically create a check containing at least, a payee, an amount, a date, a customer name, and a check number, attaching a bar code on the check using electronic placement means wherein the bar code contains the customer's account number, the bank's routing number and at least one piece of information selected from the group consisting of, the payee, the amount, the date, the customer's name, and the check number, delivering the check to the bank, scanning the bar code, and paying the check only if the information printed on the check is identical to the at least one piece of information on the bar code.

In accordance with still another aspect of the present invention, an improved negotiable instrument includes an amount box containing an amount of the negotiable instrument, a signature line for providing the identity of a drawer, a payee identifier line, an amount line, a drawee account number, a drawee routing number, and a machine readable code, the machine readable code containing the drawer's account number, the drawee's routing number and one or more pieces of information from the group consisting of the following: a payee, the amount of the negotiable instrument, a date corresponding to the date the negotiable instrument was created, the identity of the drawer, a memo, and a identifier number corresponding to the negotiable instrument.

In accordance with another aspect of the present invention, the improved negotiable instrument is a check and the machine readable code includes at least one of the following pieces of information: a payee, the amount of the negotiable instrument, the date the negotiable instrument was created, the identity of the drawer, a memo, the drawer's account number, the drawee's routing number, and the identifier number of the negotiable instruments.

In accordance with still another aspect of the present invention, the improved negotiable instrument includes a machine-readable code, a date line, the identifier number of a negotiable instrument, a name and address line of a drawer, and a memo line.

In accordance with yet another aspect of the current invention, the method includes the steps of providing a drawee, providing a drawer having an account with the drawee and a corresponding account number, delivering to the drawee at least one negotiable instrument drawn to the drawer's account, putting the at least one negotiable instrument into an electronic format to be viewed on the Internet, viewing the at least one negotiable instrument on the Internet, having the drawer advise the drawee which of the at least one negotiable instruments to pay, entering the information from the negotiable instrument into an electronic database, linking the electronic database with the drawer's account, transferring information from the electronic database to the Internet, determining if any of the at least one negotiable instruments were created by the drawer, electronically marking any of the at least one negotiable instruments that were created by the drawer, and paying the at least one negotiable instrument that the drawer has advised the drawee to pay.

In accordance with another aspect of the current invention, the method includes the steps of providing a drawer having an account with a corresponding account number, providing a drawee with a drawee routing number, providing means for creating a negotiable instrument, creating at least one negotiable instrument containing at least, a payee, a monetary amount, a date, and a drawee's identity, providing a machine readable code, attaching the machine readable code on the at least one negotiable instrument, the machine readable code containing the drawer's account number, the drawee's routing number and at least one piece of information selected from the group comprising, the payee, the monetary amount, the date, the identity of the drawer, a memo, and a identifier number corresponding to the at least one negotiable instrument, receiving the at least one negotiable instrument, scanning the machine readable code, determining whether information printed on the at least one negotiable instrument is identical to the at least one piece of information on the machine readable code, and paying the negotiable instrument only if the information on the machine-readable code is identical to the at least one piece of information on the at least one negotiable instrument.

In accordance with still yet another aspect of the current invention, the device includes means for entering data, means for creating a negotiable instrument containing at least, a payee, an amount, a date, and a drawer's identity, means for creating a machine readable code, the machine readable code containing the drawer's account number, the drawee's routing number and at least one piece of information selected from the group comprising, the payee, the amount, the date, the identity of the drawer, a memo, and an identifier number corresponding to the at least one negotiable instrument, means for scanning the machine-readable code, means for scanning the information on the negotiable instrument, and means for comparing the information from the machine-readable code to the information on the negotiable instrument.

In accordance with another aspect of the present invention the method also includes transferring the information to the drawee, entering the information into a drawee database, automatically comparing the information on the at least one negotiable instrument to the information in the drawee database, and notifying the drawer if the information printed on the at least one negotiable instrument is not identical to the at least one piece of information on the machine-readable code.

In accordance with still another aspect of the current invention, a method for integrating the creation and processing of negotiable instruments includes the steps of providing a drawer having an account with a corresponding account number, providing a drawee with a drawee routing number, creating at least one negotiable instrument containing information that contains at least, a payee, an amount, a date, and a drawee's identity, providing a machine readable code, attaching the machine readable code to the at least one negotiable instrument, the machine readable code containing the drawer's account number, the drawee's routing number and at least one piece of information selected from the group comprising, the payee, the amount, the date, the identity of the drawer, a memo, and a identifier number corresponding to the at least one negotiable instrument, transferring the information to the drawee bank, providing a payee, providing a payee bank, presenting the at least one negotiable instrument to the payee, and having the payee scan the machine-readable code.

In accordance with yet another aspect of the current invention, the method further includes the steps of having the payee electronically transfer the drawer's account number, the drawee's routing number, and the at least one piece of information to the payee bank, having the payee bank electronically transfer the drawer's account number, the drawee's routing number, and the at least one piece of information to the drawee bank, having the drawee bank determine whether the drawer's account number, the drawee's routing number, and the at least one piece of information supplied by the payee bank are identical to the information transferred to the drawee bank, and having the drawee bank pay the at least one negotiable instrument only if the drawer's account number, the drawee's routing number, and the at least one piece of information supplied by the payee bank are identical to the information transferred to the drawee bank.

In accordance with another aspect of the current invention, the method further includes the steps of providing an integrated system, wherein the drawee and the drawer's creation of the at least one negotiable instrument are linked, whereby when the at least one negotiable instrument is created, the information is stored in a drawee database, providing means for the drawer to view the drawer's account, and having the drawee bank automatically update the drawer's account to reflect payment of the at least one negotiable instrument, thereby creating an up to date amount in the drawer's account.

One advantage of the present invention is that the bank and the customer can have greater confidence that the checks that are paid from the customer's account are accurate.

Another advantage of the present invention is that a more secured method for protecting against check fraud is provided.

Yet another advantage of the current invention is that a bank can quickly and efficiently determine which of the customer's checks are authentic.

Still another advantage of the current invention is that the entire process of writing, clearing, and paying checks is integrated, automated, and expedited.

Another advantage of the present invention is that the payment of the check and the balancing of the checking account are automated, expedited, and integrated.

Still other benefits and advantage s of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in the specification and illustrated in the accompanying drawing which forms a part hereof and wherein.

DESCRIPTION OF THE PREFERRED EMBODIMENT

Figure 1:
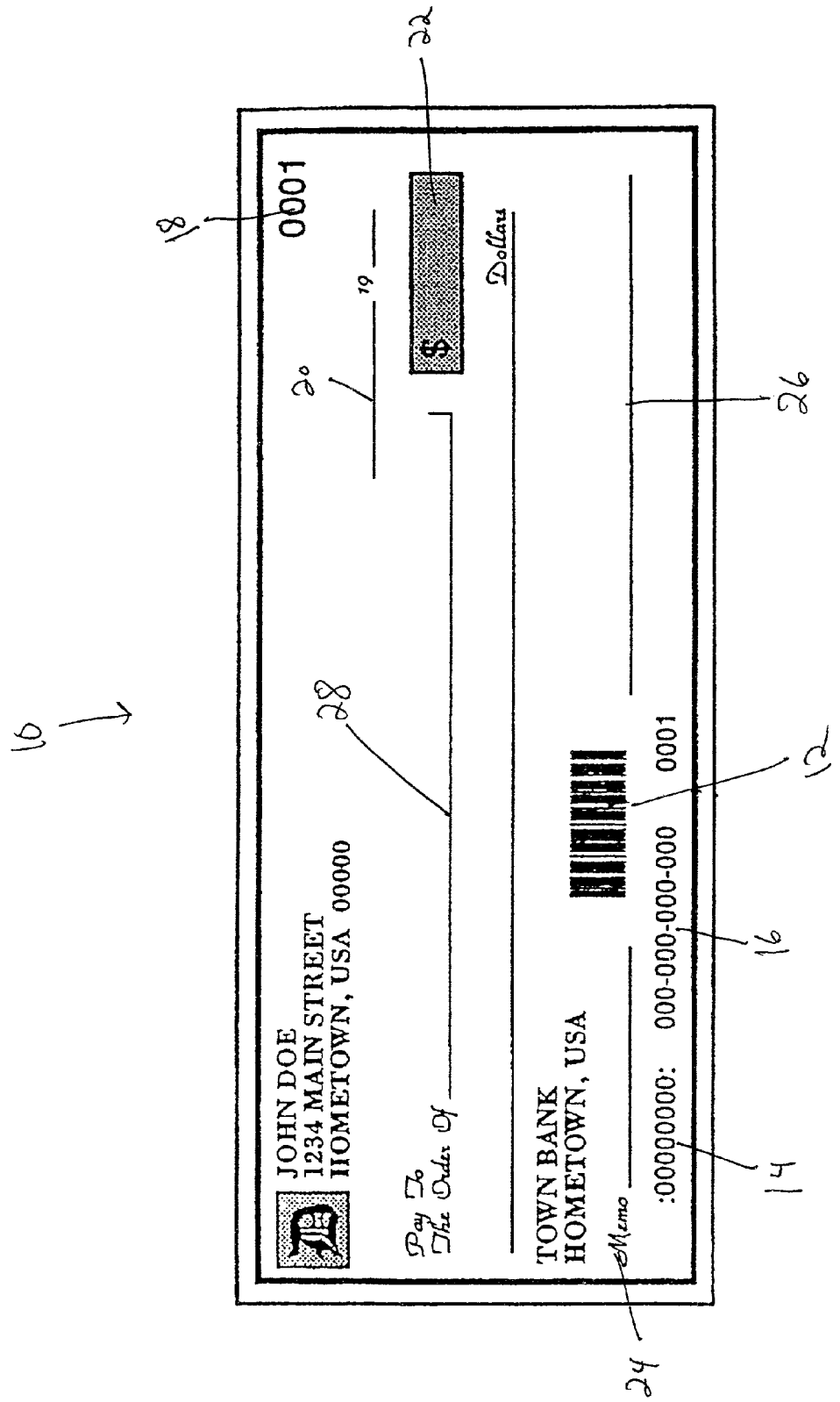
FIG. 1—is a plan view of the inventive check showing a barcode, a routing number, an account number, a check number, a date line, an amount box, a signature line, a payee identifier line, and a memo line.

With reference now to FIG. 1, an inventive check 10, for aiding in the prevention of check fraud, includes a barcode 12, a routing number 14, an account number 16, a check number 18, a signature line 26, a payee identifier line 28, a date line 20, an amount box 22, and a memo line 24. In a preferred embodiment, the bar code 12 is placed on the check 10 after the check 10 has been written by the customer. The barcode 12 includes the amount of the check 10, the date the check 10 was written, the account number 16, the bank's routing number 14, and the payee of the check 10. The present invention encompasses using any one, or any combination, of these elements. However, in the preferred embodiment, all of the elements are included in the barcode 12. The bar code 12 is a standard bar code (e.g., UPC, EAN, JAN, or UPC 128), which is readable by a variety of bar code reading devices. The check 10 and the bar code 12 are only intended to be preferred embodiments of the invention. Any negotiable instrument or machine readable code may be used in the place of the check 10 and the bar code 12, respectively.

In the preferred embodiment, the customer writes a check 10, by entering the necessary information into a software program. The customer enters the information required, in the software fields, for the check 10. The software program then generates, electronically, a check 10 containing all the information entered by the customer. Once the check 10 has been created, the information from the check 10, including the payee, the amount of the check 10, the date of the check 10, the check number 18, the account number 16, and the drawee bank's routing number 14 are electronically transferred to the drawee bank. The transfer of the information to the drawee bank preferably takes place over a secured line modem, but any means of transferring, electronically or otherwise, the information can be used, as long as chosen using sound engineering judgment. When the drawee bank receives the information, the information is downloaded into the drawee bank's system in preparation for the presentment of the check 10.

The software program is linked to an apparatus that can print the check 10 as well as a barcode 12 on the check 10. The invention also encompasses the bar code 12 being printed on an adhesive sticker and applied to one of several locations on the check 10. If the adhesive sticker bar code 12 is used, then the check 10 does not need to be generated by a software program. As long as the bar code 12 is generated by the software program, the bar code 12 can be applied to a regular, blank check 10.

Once the information is entered into the software program by the customer, the printer will print the check 10 with the barcode 12 on the check 10. The barcode 12 will include some or all of the following: the payee of the check, the amount of the check, date the check was written, the drawer's account number, the drawee's routing number, and the identifier number of the check 10. The operation of the printer, and application of the barcode 12 to the check 10, is well known in the art and, for the sake of brevity, will not be described herein.

The check 10 is then sent to the payee. When the payee presents the check 10 to the bank, the bank then uses a laser scanner, which is connected to the drawee's system, to read the bar code 12 on the check 10. The laser scanner is scanned across the bar code 12 to read the bar code 12. The laser scanner may be either a hand-held scanner or a stationary bar code scanner capable of reading the bar code 12. The information from the bar code 12 is entered into the bank's system and the system determines the account number, the routing number, the amount of the check 10, the date the check 10 was written, and any other information contained in the bar code 12. The information from the bar code 12 is compared to the information on the check 10. If the information on the check 10 matches the information on the barcode 12, the bank then pays the check 10. The barcode scanner used by the bank can be any type of scanner chosen using sound engineering judgement. The operation of the barcode scanner is well known in the art, and, for sake of brevity, will not be further described herein.

The entire system of the preferred embodiment is done automatically. This allows the process to be available to individuals as well as large companies. The inventive process will allow banks, and other financial institutions, to check the authenticity of every check 10 that the bank processes. The checks 10 are received in large quantities and are simply fed into the bar code scanner and each bar code 12 is read by the scanner and the information on the bar code 12 is compared to the information that the bank received from the customer when the check 10 was created. If the information matches, the system simply pays the check 10.

If the information does not match, then the system sends a notice to the customer about the discrepancy. This notification to the customer could take place via any method chosen using sound engineering judgment, but in the preferred embodiment, the bank sends the information to the customer via an on-line banking system.

When the customer views the account on-line, the checks 10 that did not match will be presented to the customer, and the customer can either tell the bank to go ahead and pay the check 10 anyway, or to not pay the check 10. If the customer tells the bank not to pay the check 10, the bank can then proceed with an investigation of the fraudulent check.

The invention also encompasses the drawee simply paying the check 10 after the bar code 12 has been scanned, and the corresponding check 10 has been authenticated. In this embodiment, the drawee does not compare the information from the check 10 to the information provided on the bar code 12. The check 10 will be paid according to the information provided on the bar code 12.

In another preferred embodiment, the check 10 does not include a barcode 12. A check 10 is written by the drawer, in typical fashion, and then sent out to the payee. When the payee presents the check 10 to the bank, the bank transfers the information from the check 10 into an electronic database, wherefrom the information is transferred via the Internet to a central database. The transfer of the information from the bank's electronic database via the Internet can be done by any means chosen using sound engineering judgment, but preferably the transfer takes place through a modem and data link. The data link allows transfer of the information between the bank's modem and the Internet. The drawer accesses the drawer's account via the Internet, and views the checks 10 that have been presented for payment to the bank. The operation and institution of on-line bank accounts and on-line banking are well known in the art and, for the sake of brevity, will not be further described herein. The drawer then marks off the checks 10 that are authentic, and sends the information to the bank. The bank then pays only the checks 10 that have been authorized by the drawer.

In a most preferred embodiment, the entire process is integrated and automated. The inventive process of the most preferred embodiment integrates the process from the writing of the check 10, to the payment of the check 10, to the balancing of the checking account. In the most preferred embodiment, the bank and the customer utilize the same system. The bank provides a network, or an on-line banking system, for the customer's account, so that when the customer accesses the account, the customer is linked to the bank's system.

The process begins with the customer writing a check 10. The customer enters the information into a computer to create the check 10. As soon as the information is entered and approved by the customer, the information on the check 10, which includes the payee, the amount of the check 10, the date the check 10 was created, the customer's account number 16, the bank's routing number 14, and the check number 18, is in the bank's system, and the bank is then aware that that check 10 has been authorized by the customer. Just as in the previous embodiment, the check 10 is then printed out with a bar code 10 attached to it with the relevant information contained in the bar code 12. The check 10 is then presented to the payee, who scans the check 10 using a bar code scanner to read the bar code 12. The information from the bar code 12 is sent directly to the payee's bank for clearing and the payee bank electronically transfers the information to the drawee bank. Since the drawee bank already has the information from the bar code 12 in the bank's system, the drawee bank approves the payment of the check 10, debits the customer's account and the payee bank then credits the payee's account. This process is virtually instantaneous, thereby avoiding the sometimes days long delay of payment for the payee or the payee's bank.

When the drawee bank debits the customer's account, the bank's system is automatically updated and the customer's account reflects the departure of the funds. In the inventive process, the customer's record of the account is also automatically updated to reflect the payment of the check 10. This eliminates the need to balance the checking account at the end of each month. When the customer logs onto the on-line banking system to view the customer's account, the amount of money in the account will always be up to date.

The most preferred embodiment encompasses the bank directly making the payment to the payee instead of creating the check 10. When the customer enters the information for the creation of the check 10, the bank automatically makes a payment to the payee in the authorized amount.

The most preferred embodiment also encompasses the customer and the bank using different systems, where when the check 10 was created, the customer would have to transfer the information from the customer's system to the bank's system, and when the check was paid by the bank, the bank would have to transfer the information from the bank's system to the customer's system.

Another preferred embodiment that relates to the most preferred embodiment includes integrating the entire process at the point of sale as well. In this preferred embodiment, the check 10 is written by hand by the customer. When the customer presents the check 10 to the payee, the payee scans the check 10 using an optical scanner capable of reading the physical writing on the check 10. The information from the check 10 is then sent directly to the payee's bank, which then transfers the information to the drawee bank. The drawee bank would then transfer the information to the customer's account for approval. When the customer logs onto the on-line banking system, the check 10 will be presented for approval. Once the customer's approval has been obtained, the drawee bank then makes the payment to the payee's bank, which in turn makes the payment to the payee.

The invention has been described with reference to preferred embodiments. It is to be understood that the references to checks throughout this specification apply equally well to any negotiable instrument, and the references to banks apply equally well to any financial institution. The invention also encompasses the payee bank and the drawee bank being the same entity. Obviously, modifications and alterations will occur to others upon a reading and understanding of this specification. It is intended to include all such modifications and alternations in so far as they come within the scope of the appended claims or the equivalents thereof.

I claim:

1. A method for preventing check fraud, the method comprising the steps of:

electronically creating a check containing a first set of information, the first set of information comprising at least a payee, an amount, a date, a customer name, and a check number;

attaching a bar code to the check using electronic placement means wherein the bar code contains an associated customer's account number, an associated bank's routing number and a second set of information, the second set of information is at least the payee and the amount;

electronically transferring the account number, the routing number, and the second set of information to the associated bank;

presenting the check, with the attached bar code, to the bank;

scanning the bar code at the associated bank, thereby entering the information on the bar code into the associated bank's database;

comparing the electronically transferred second set of information and the information from the bar code in the associated bank's database; and, paying the check in response to the comparison only if the electronically transferred second set of information is identical to the corresponding portion of the information from the bar code in the associated bank's database.

2. A method for preventing fraud, the method comprising the steps of:

delivering to an associated drawee at least one negotiable instrument drawn to an associated drawer's account;

the drawee entering information from the negotiable instrument into an electronic database;

linking the electronic database with the drawer's account;

transferring the information from the electronic database to a global computer network;

providing an associated drawer access to the global computer network;

providing the drawer access to the information from the negotiable instrument;

accessing the at least one negotiable instrument on the global computer network;

providing comparison of the information from the electronic database with information from the negotiable instrument recorded by the drawer; and, having the drawer advise the drawee whether or not to pay the at least one negotiable instrument based upon on the comparison.

3. The method of claim 2, wherein the at least one negotiable instrument is at least two negotiable instruments and the step of having the drawer advise the drawee whether or not to pay the at least one negotiable instrument comprises the step of:

having the drawer advise the drawee which of the at least two negotiable instruments to pay based upon the comparison.

4. The method of claim 3, wherein the method further comprises the steps of:

determining if any of the at least two negotiable instruments were created by the drawer; and, electronically marking any of the at least two negotiable instruments that were created by the drawer.

5. The method of claim 4, wherein the method further comprises the step of:

paying all of the negotiable instruments that the drawer has advised the drawee to pay.

6. The method of claim 2, wherein accessing the at least one negotiable instrument on the global computer network comprises the steps of:

determining if the at least one negotiable instrument was created by the drawer; and, electronically marking the at least one negotiable instrument if the at least one negotiable instrument was created by the drawer.

7. The method of claim 6, wherein the method further comprises the step of:
  paying the at least one negotiable instrument that the drawer has advised the drawee to pay.

8. A method for preventing fraud, the method comprising the steps of:
  creating at least one negotiable instrument containing a first set of information, the first set of information containing at least, a payee, an amount, a date, and an associated drawee's identity;
  attaching a machine readable code to the at least one negotiable instrument, the machine readable code containing a second set of information, the second set of information comprising an associated drawer's account number, the drawee's routing number, the payee, and the amount;
  the drawer electronically transferring the second set of information to the drawee, for later comparison with the negotiable instrument when the negotiable instrument is presented to the drawee;
  wherein electronically transferring the second set of information to the drawee comprises the steps of:
    the drawee receiving the at least one negotiable instrument; and,
    the drawee scanning the machine-readable code, thereby entering the second set of information on the machine readable code into the drawee's database for later comparison with the negotiable instrument when the negotiable instrument is presented to the drawee;
  the drawee comparing the electronically transferred second set of information and the information from the machine readable code in the drawee's database; and,
  paying the negotiable instrument in response to the comparison only if the electronically transferred second set of information is identical to the corresponding portion of the information from the machine readable code in the drawee's database.

9. A method for integrating the creation and processing of negotiable instruments, the method comprising the steps of:
  providing a drawer having an account with a corresponding account number;
  providing a drawee with a drawee routing number;
  creating at least one negotiable instrument containing a first set of information, the first set of information comprising a payee, an amount, a date, and a drawee's identity;
  attaching a machine readable code to the at least one negotiable instrument, the machine readable code containing a second set of information, the second set of information comprising the drawer's account number, the drawee's routing number, the payee, and the amount;
  electronically transferring the second set of information to an associated drawee bank;
  providing a payee bank;
  presenting the at least one negotiable instrument, with the attached machine readable code, to the payee;
  having the payee transfer the at least one negotiable instrument to the payee bank;
  having the machine readable code scanned, thereby entering the information on the machine readable code into the payee bank's database;
  having the payee bank electronically transfer the results of the scan of the machine readable code to the drawee bank;
  having the drawee bank compare the results of the scan of the machine readable code to the second set of information; and,
  having the drawee bank pay, in response to the comparison, the at least one negotiable instrument only if the information from the machine readable code is identical to the second set of information.

10. The method of claim 9, wherein the method further comprises the steps of:
  providing an integrated system, wherein the drawee and the drawer's creation of the at least one negotiable instrument are linked, whereby when the at least one negotiable instrument is created, the first set of information is stored in a drawee database;
  providing means for the drawer to access the drawer's account;
  having the drawee bank automatically update the drawer's account to reflect payment of the at least one negotiable instrument, thereby creating an up to date amount in the drawer's account.

11. The method of claim 9, wherein having the machine readable code scanned comprises the steps of:
  having the payee scan the machine-readable code, thereby entering the information on the machine readable code into the payee's database; and,
  having the payee electronically transfer the results of the scan of the machine readable code to the payee bank.

12. The method of claim 9, wherein having the machine readable code scanned comprises the step of:
  having the payee bank scan the machine readable code, thereby entering the information on the machine readable code into the payee bank's database.

* * * * *